(12) United States Patent
Elford et al.

(10) Patent No.: US 12,486,430 B2
(45) Date of Patent: Dec. 2, 2025

(54) PREFORM ASSEMBLY

(71) Applicant: McLaren Automotive Limited, Woking (GB)

(72) Inventors: Joseph Gary Elford, woking (GB); Mathew Philip Rutt, Woking (GB)

(73) Assignee: McLaren Automotive Limited, Woking (GB)

( * ) Notice: Subject to any disclaimer, the term of this patent is extended or adjusted under 35 U.S.C. 154(b) by 0 days.

(21) Appl. No.: 18/034,431

(22) PCT Filed: Oct. 21, 2021

(86) PCT No.: PCT/GB2021/052732
§ 371 (c)(1),
(2) Date: Apr. 28, 2023

(87) PCT Pub. No.: WO2022/090691
PCT Pub. Date: May 5, 2022

(65) Prior Publication Data
US 2023/0392046 A1  Dec. 7, 2023

(30) Foreign Application Priority Data
Oct. 28, 2020  (GB) ..................... 2017109

(51) Int. Cl.
*C09J 7/20* (2018.01)
*C09J 163/00* (2006.01)

(52) U.S. Cl.
CPC .............. *C09J 7/201* (2018.01); *C09J 163/00* (2013.01); *C09J 2301/122* (2020.08); *C09J 2301/50* (2020.08)

(58) Field of Classification Search
CPC .... C09J 7/201; C09J 163/00; C09J 2301/122; C09J 2301/50; C09J 2301/204; C09J 2463/00; C09J 7/30; C09J 5/00; C09J 7/10; C09J 2203/00; C09J 2203/35; C09J 2203/354; C09J 2301/20; B29C 70/48; B29C 70/543
See application file for complete search history.

(56) References Cited

U.S. PATENT DOCUMENTS

| | | |
|---|---|---|
| 2016/0326413 A1 | 11/2016 | Schuh et al. |
| 2018/0155580 A1 | 6/2018 | Jakobeit et al. |
| 2019/0077997 A1 | 3/2019 | Demarez et al. |

FOREIGN PATENT DOCUMENTS

| | | |
|---|---|---|
| EP | 0063403 | 10/1982 |
| JP | 2004175863 | 6/2004 |

(Continued)

OTHER PUBLICATIONS

International Preliminary Report on Patentability in International Appln. No. PCT/GB2021/052732, mailed on May 11, 2023, 7 pages.

(Continued)

*Primary Examiner* — Patricia L. Nordmeyer
(74) *Attorney, Agent, or Firm* — Fish & Richardson P.C.

(57) ABSTRACT

A tape comprising: a backing layer; and an epoxy resin layer adhered to a first surface of the backing layer in a spiral pattern, the first surface providing a first level of adherence to the epoxy resin layer so that when the epoxy resin layer is applied to a surface the backing layer can be removed from the epoxy resin layer.

21 Claims, 7 Drawing Sheets

(56) References Cited

FOREIGN PATENT DOCUMENTS

| KR | 20150005473 | 1/2015 | | |
|----|----|----|----|----|
| WO | WO 2009094572 | 7/2009 | | |
| WO | WO-2014204803 A1 | * 12/2014 | ........... | A44B 18/008 |
| WO | WO 2017109011 | 6/2017 | | |
| WO | WO 2019179636 | 9/2019 | | |

OTHER PUBLICATIONS

International Search Report and Written Opinion in International Appln. No. PCT/GB2021/052732, mailed on Jan. 26, 2022, 12 pages.

Amazon.com [online], "Guarantape 5 Toffee Tape—Double Sided High Strength Adhesive Tape", Mar. 2021, retrieved on Mar. 3, 2021, retrieved from <https://www.amazon.co.uk/dp/B08599G97C/?coliid=I2CFWUAVBI7F5V&colid=IBX7AIILDE9UC&psc-0&ref_=lv_ov_lig_dp_it>, 3 pages.

Search Report in United Kingdom Appln. No. GB2017109.6, mailed Aug. 24, 2021, 2 pages.

Search Report in United Kingdom Appln. No. GB2017109.6, mailed Mar. 26, 2021, 5 pages.

* cited by examiner

PREFORM ASSEMBLY

CROSS-REFERENCE TO RELATED APPLICATIONS

The present application is the national stage entry of International Patent Application No. PCT/GB2021/052732, filed on Oct. 21, 2021, and claims priority to Application No. GB2017109.6, filed on Oct. 28, 2020, the disclosures of which are incorporated herein by reference thereto.

FIELD OF THE INVENTION

This invention relates to forming composite components and a double sided tape for assisting with the forming.

BACKGROUND

An increasing number of relatively large components are being made by moulding. Many of these are composite components, typically fibre-reinforced resin components made of systems such as carbon-fibre/epoxy. Some examples are tubs for automobiles, wings for aircraft, blades for wind turbines and masts for yachts.

One method of forming moulded components involves forming preformed pieces that comprise reinforcing fibre. The preformed pieces are formed over individual moulds and fixed into a specific shape hence being a preformed piece. The preformed pieces may include heat activatable binder to hold the reinforcing fibre in the specific shape after the initial forming. These preformed pieces are then assembled together into a mould where a resin transfer moulding step can be used to fix the pieces together to form a composite component. Other elements may be included in the mould prior to the moulding step, for instance non-preformed reinforcing fibre or metal components. Some pieces may be attached to other pieces prior to insertion into the mould so that they keep their relative position during the moulding process.

Example methods of attaching one piece to another are a mechanical connection such as sewing or stapling, or through the use of a spray-on adhesive. Mechanically connecting the pieces together is time consuming and also add to the cost of fabricating the moulded component due to the time involved in attaching the pieces together. The application of a spray-on adhesive to the pieces is relatively uncontrolled which leads to problems in applying the adhesive only to the areas that require it. This can lead to issues with the subsequent resin transfer moulding step because of too much adhesive contaminating the resin that is injected into the mould.

Therefore, it would be desirable to have improvements to the method of assembling the pieces that form a composite component prior to resin infusion.

SUMMARY

According to a first aspect of the present invention there is provided a tape comprising: a backing layer; and an epoxy resin layer adhered to a first surface of the backing layer, the first surface providing a first level of adherence to the epoxy resin layer so that when the epoxy resin layer is applied to a surface the backing layer can be removed from the epoxy resin layer.

According to a second aspect of the present invention there is provided a tape comprising: a backing layer; and an epoxy resin layer adhered to a first surface of the backing layer in a spiral pattern, the first surface providing a first level of adherence to the epoxy resin layer so that when the epoxy resin layer is applied to a surface the backing layer can be removed from the epoxy resin layer.

The backing layer may have a length and the epoxy resin layer may be adhered along the length of the first surface. The epoxy resin layer may be adhered along the whole length of the first surface.

The backing layer may have a width and the epoxy resin layer may be adhered across part of the width of the first surface. The epoxy resin layer may be adhered across a central portion of the width of the first surface.

The epoxy resin layer may be adhered to the first surface in a spiral pattern. The backing layer may comprise a second surface, the epoxy resin layer may contact the second surface when the tape is rolled, wherein the second surface may have a second level of adherence to the epoxy resin layer, the second level of adherence may be lower than the first level of adherence so that when the tape is unrolled the epoxy resin layer remains adhered to the first surface.

According to a third aspect of the present invention there is provided a method for forming a composite component, the method comprising: providing a first piece comprising reinforcement material; providing a tape comprising a resin layer adhered to a first surface of the backing layer; applying at least one length of the tape to the first piece so that the resin layer contacts the first piece; removing the backing layer of the at least one length of tape leaving the resin layer adhered to the first piece; and attaching a second piece comprising reinforcement material to the first piece using the resin layer adhered to the first piece.

According to a fourth aspect of the present invention there is provided a method for forming a composite component, the method comprising: providing a first piece comprising reinforcement material, the first piece being preformed into a set shape; providing a tape comprising a resin layer adhered to a first surface of the backing layer; applying at least one length of the tape to the first piece so that the resin layer contacts the first piece; removing the backing layer of the at least one length of tape leaving the resin layer adhered to the first piece; and attaching a second piece comprising reinforcement material to the first piece using the resin layer adhered to the first piece.

The method may comprise: attaching a third piece comprising reinforcement material to the first piece using the resin adhered to the first piece. The method may comprise: applying at least one length of the tape to the second piece so that the resin layer contacts the second piece; removing the backing layer of the at least one length of tape leaving the resin layer adhered to the second piece; and attaching a fourth piece comprising reinforcement material to the second piece using the resin adhered to the second piece.

The method may comprise: loading the attached pieces into a mould cavity of a mould; injecting a matrix material into the mould cavity to infuse the pieces with the matrix material, the resin layer being incorporated into the matrix material; and solidifying the matrix material to set in shape the reinforcement material of the pieces. The method may comprise injecting a hardener with the matrix material into the mould cavity. The method may comprise loading other pieces comprising reinforcement material into the mould cavity.

At least some of the pieces may be preformed into set shapes. The matrix material may be a resin. The matrix material may be capable of dissolving the resin layer. The matrix material may be an epoxy resin. The resin layer may be an epoxy resin.

The epoxy resin layer may comprise one of EPIKOTE™ Resin MGS® PR 685, EPIKOTE™ Resin MGS® PR 687G and EPIKOTE™ Resin MGS® PR 688. The epoxy resin layer may be selected from EPIKOTE™ Resin MGS® PR 685, EPIKOTE™ Resin MGS® PR 687G, and EPIKOTE™ Resin MGS® PR 688.

BRIEF DESCRIPTION OF THE DRAWINGS

The present invention will now be described by way of example with reference to the accompanying drawings. In the drawings.

DETAILED DESCRIPTION

The following description is presented to enable any person skilled in the art to make and use the invention, and is provided in the context of a particular application. Various modifications to the disclosed embodiments will be readily apparent to those skilled in the art.

The general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

The present invention relates to a tape comprising a backing layer and an epoxy resin layer adhered to a first surface of the backing layer. The first surface provides a first level of adherence to the epoxy resin layer so that when the epoxy resin layer is applied to a surface the backing layer can be removed from the epoxy resin layer. The present invention also relates to a method for forming a composite component, the method comprises providing a first piece comprising reinforcement material and providing a tape comprising a resin layer adhered to a first surface of the backing layer. The method further comprises applying at least one length of the tape to the first piece so that the resin layer contacts the first piece, removing the backing layer of the at least one length of tape leaving the resin layer adhered to the first piece, and attaching a second piece comprising reinforcement material to the first piece using the resin layer adhered to the first piece.

Figure 1:
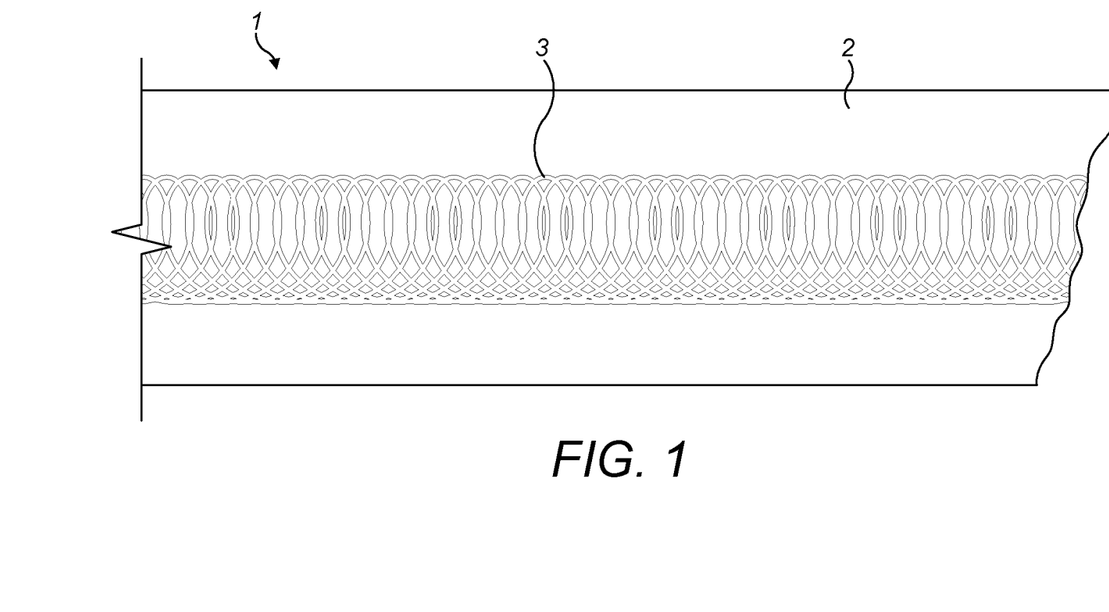
FIG. 1 shows a double-sided tape.
Figure 2:
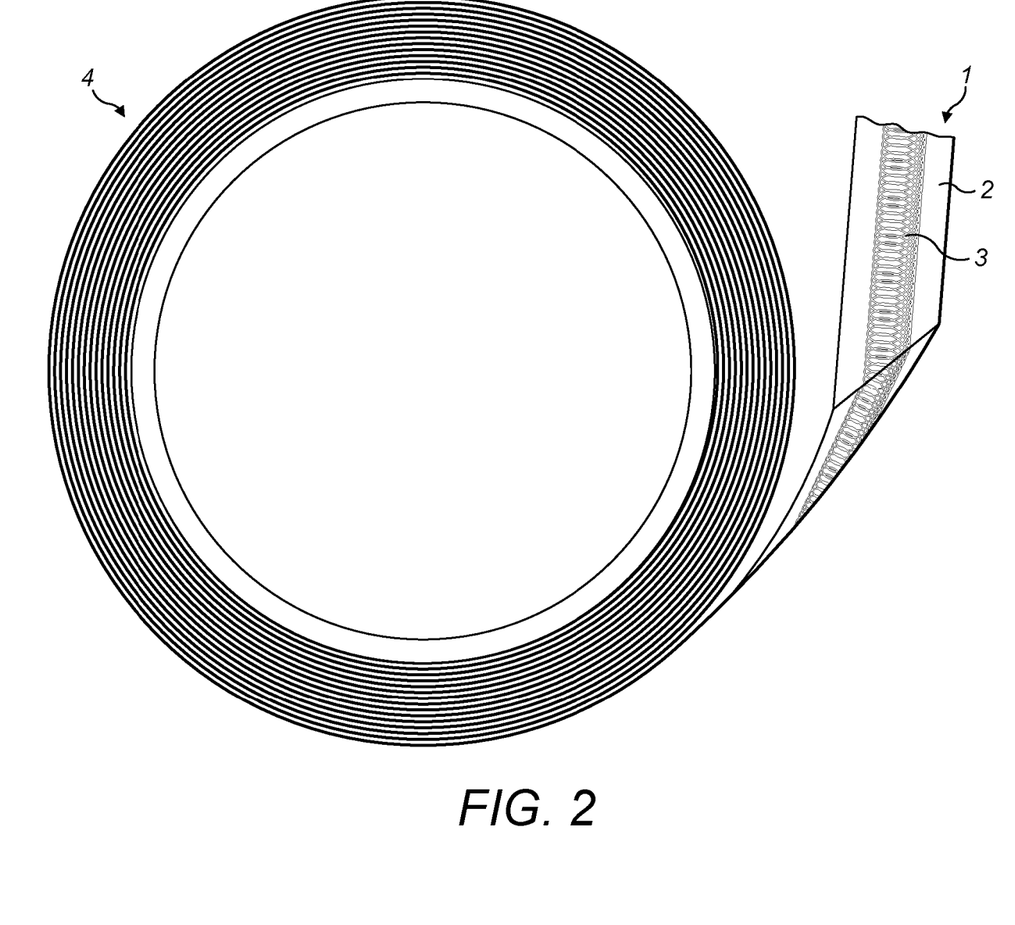
FIG. 2 shows a roll of double-sided tape.

FIG. 1 shows a tape 1. The tape 1 is a double-sided tape and is thus configured to adhere to external elements on both sides of the tape once applied to a first element. The tape 1 comprises a backing layer 2. The backing layer 2 is present to permit the delivery of an adhesive to an element that is to be adhered to another element. The tape 1 comprises a resin layer 3 adhered to the backing layer 2. The backing layer 2 has a length and a width. FIG. 2 shows the tape 1 as a roll of tape 4. The tape 1 is rolled along its length.

The backing layer 2 has a first surface to which the resin layer 3 is adhered. The backing layer 2 provides a first level of adherence to the resin layer 3. This first level of adherence is such that when the resin layer 3 is applied to a surface, the resin layer sticks to surface with a higher adherence than the first level of adherence so that the backing layer 2 can be removed from the resin layer 3. In this way, another element can be adhered to the resin layer 3 from the side where the backing layer used to be present. The tape 1 can therefore act as a double-sided tape.

The backing layer 2 has a second surface opposite the first surface. The epoxy resin layer contacts the second surface when the tape in a roll 4. The second surface has a second level of adherence to the resin layer 3. The second level of adherence is lower than the first level of adherence to the resin layer 3. The means that when the tape 1 is unrolled the resin layer remains adhered to the first surface of the backing layer 2.

The resin layer 3 is adhered along the length of the first surface of the backing layer 2. The resin layer 3 may be adhered along the whole length of the first surface of the backing layer 2. It will be appreciated that there may be some parts of the length of the tape where the application of the resin layer 3 to the backing layer 2 has not been applied as intended meaning some portions of the backing layer 2 along its length may have less resin in the resin layer and some portions of the backing layer along its length may have more resin in the resin layer. Therefore, when the resin layer 3 is applied along the whole length of the first surface there may be some non-uniformity to the application along the length of the backing layer 2.

As shown in FIG. 1, the resin layer 3 is adhered across the width of the first surface. The resin layer 3, as pictured in FIG. 1, may be adhered across a portion of the width of the first surface. The resin layer 3 may be adhered across a central portion of the width of the first surface. The resin layer 3 may be applied to the backing layer in any suitable configuration. One example is that the resin layer 3 may be applied to the backing layer as a continuous layer of resin. However, it is more advantageous if, as pictured in FIG. 1, the resin layer 3 is adhered to the first surface in a spiral pattern. The resin layer 3 is applied as a thin bead that is spiralled on to the backing layer. This can be advantageous in applications where less resin is required to adhere two surfaces together than would be provided by a continuous film of the resin. The spiral pattern permits matrix material in a subsequent infusion step to penetrate through the resin layer 3 and avoid dry spots in the underlying material.

The resin layer 3 may be an epoxy resin. The resin layer 3 may be a very high viscous resin. The viscosity of the resin layer 3 may be between 10000 mPa·s and 40000 mPas·s. The resin layer 3 may be Hexion PR687g (the full name being EPIKOTE™ Resin MGS® PR 687G). Alternative formulations may also be made into tapes such as EPIKOTE™ Resin MGS® PR 685G and EPIKOTE™ Resin MGS® PR 688G.

The resin layer 3 may be compatible with a matrix material used during a moulding process such as that described with reference to FIG. 3. For instance, both the resin layer 3 and the matrix material may be epoxy based. The resin layer 3 may be soluble in the matrix material. The resin layer 3 can be used between carbon fibre layers without lowering the interlaminar shear strength of the resultant composite part. This is as compared to conventional spray adhesive which does lower the interlaminar shear strength.

The tape 1 described herein is particularly useful during a forming process for a composite component. This is because the resin that is used to adhere pieces of reinforcement material together can be the same as the resin used during a resin transfer process to set the pieces in their final configuration. The resin layer in the tape may be formed of a material that does not contaminate the resin used during a resin transfer process. For instance, they can both be epoxy resin with the resin used on the tape not having a hardener present whereas the resin used in the resin transfer process having a hardener present to form the final shape. The resin used in the resin transfer process may alternatively be UV curable.

A forming process that uses the tape 1 described herein will be described with reference to FIG. 3. FIG. 3 illustrates a number of steps that can take place in a method of forming a composite component.

Figure 3A:
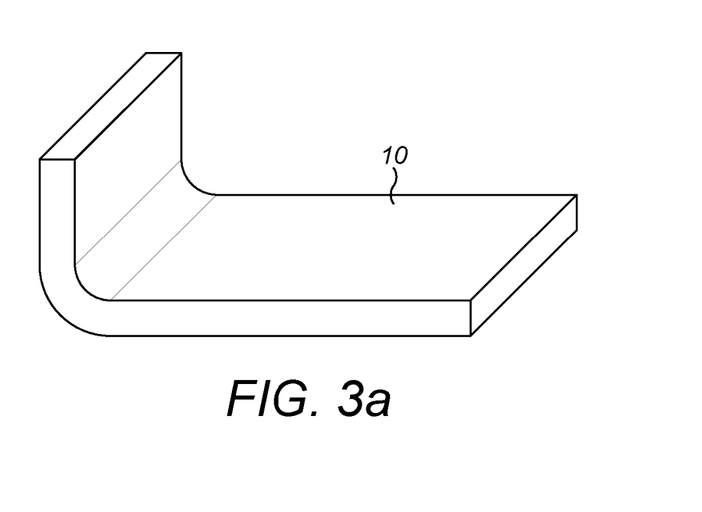
FIG. 3a, 3b, 3c, 3d, 3e, 3f, 3g, 3h shows the stages of forming a composite component.

FIG. 3a shows a first piece 10 that comprises reinforcement material. The reinforcement material may be any reinforcement that is suitable for infusion with a matrix material. The first piece shown in FIG. 3a has been preformed into a first set shape. The first piece may comprise a binder material which has been used to hold the reinforcement material into the first set shape. The first piece may be preformed using any suitable method. For example, a double diaphragm forming machine may be used to form the piece about a mould and set the binder material so that the first piece is held in a first set shape. The binder material may be heat activatable. For instance, it may cure once heated and thus hold the reinforcement fibres in a particular shape or the binder may thermoplastic and thus resolidify after heating which then holds the reinforcement fibres in a particular shape. The bond of the resin layer 3 may be reversible with the application of heat. This permits the repositioning of pieces joined together with the resin layer(s).

Figure 3B:
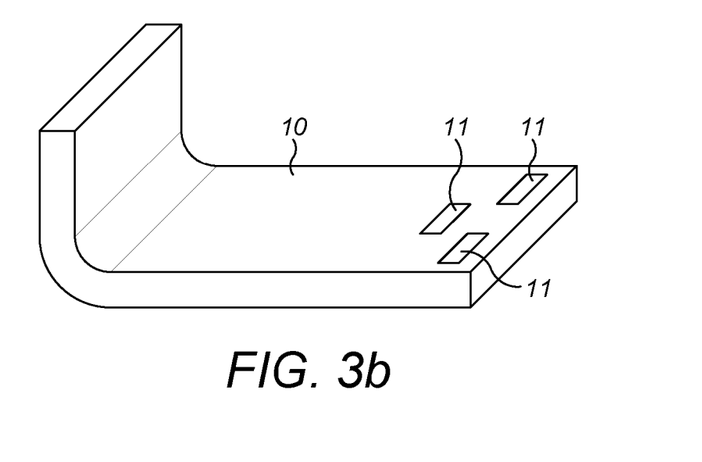

FIG. 3b shows at least one length 11 of the tape 1 comprising the resin layer adhered to the first surface of the backing layer 2 having been applied to the first piece. In FIG. 3b, three lengths of tape have been applied to the first piece. It will be appreciated that any number of lengths of tape can be applied to the first piece that are required for the attachment of a second piece to the first piece. The lengths of tape are applied to the surface of the first piece in areas where the second piece will contact the first piece when assembled together.

Figure 4:
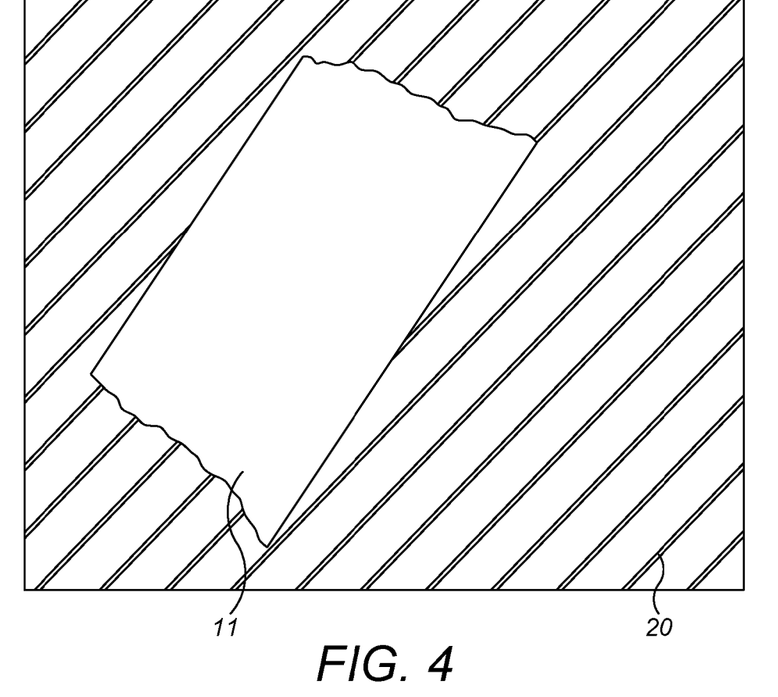
FIG. 4 shows a length of tape applied to a piece comprising reinforcement fibres.

FIG. 4 shows an example of a length 11 of tape 1 being applied to a piece 20 comprising reinforcement material. In this case the reinforcement material comprises carbon fibre. The reinforcement material may be carbon fibre. The reinforcement material may be weaved into a mat. The reinforcement material may be held together by threads that are sewn through the reinforcement material.

Figure 3C:
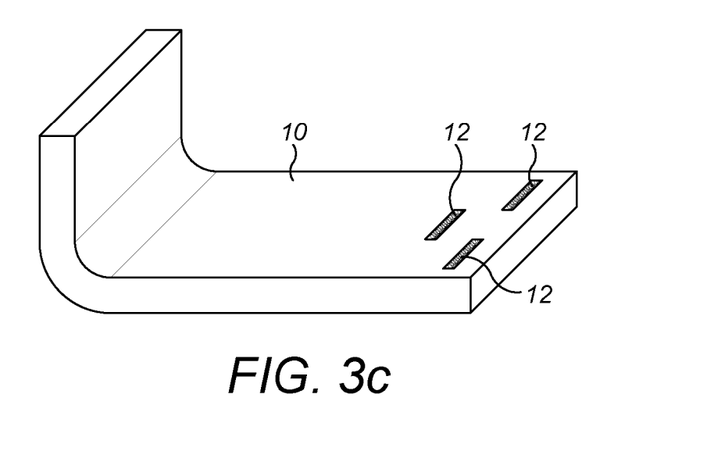

FIG. 3c shows the removal of the backing layer 2 from the length(s) of tape that were applied to the first piece. Once the lengths 11 of tape 2 have been applied to the first piece the backing layer 2 can be removed leaving the resin layers 12 of the lengths of tape 11 adhered to the first piece 10. The removal of the backing layer 2 exposes the other side of the resin layer 3 so which other pieces can then be applied. The use of a tape 1 to apply the resin layer 3 is particularly efficient as the resin is applied only in the areas to which the tape is applied. This reduces wastage and prevents the application of the resin to areas that do not need it applying. The selective application of the resin layer means that the resin layer is only applied to the areas that need it which means in a subsequent infusion step the local impact of the tackifier on the glass transition temperature of the injected matrix material is reduced.

Figure 5:
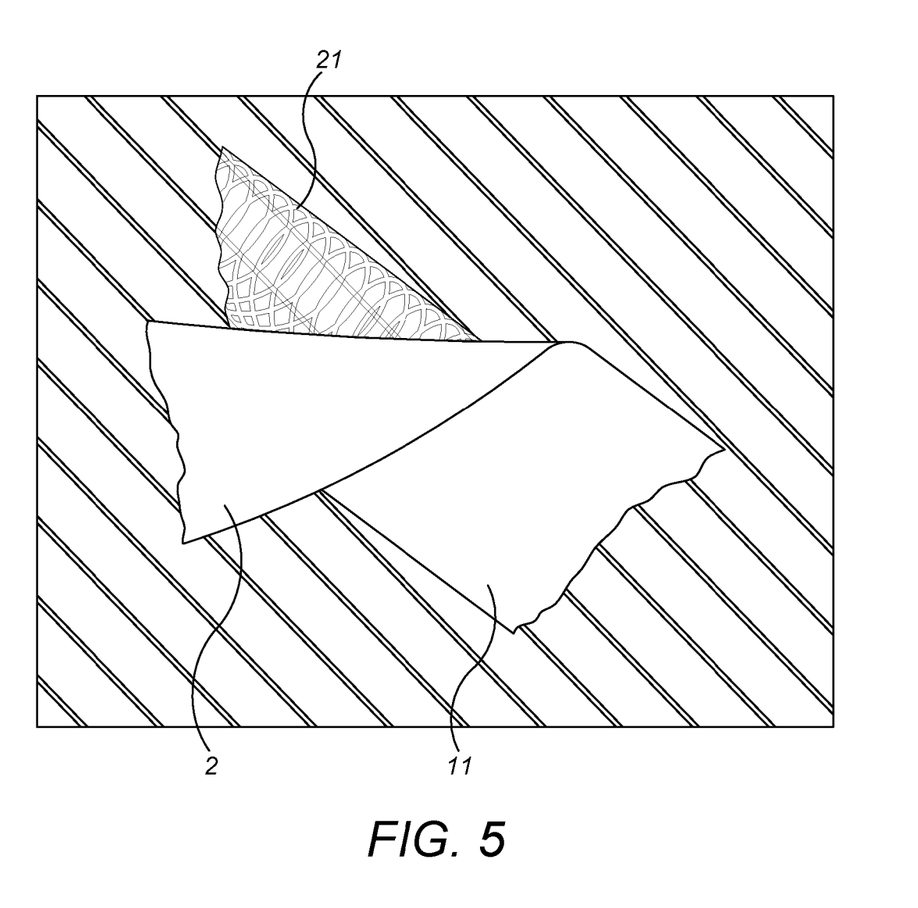
FIG. 5 shows a backing layer being removed from the tape applied to the piece comprising reinforcement fibres.

FIG. 5 shows an example of the backing layer 2 being removed from the piece 20. This shows the resin layer being 21 left adhered to the piece 20.

Figure 3D:
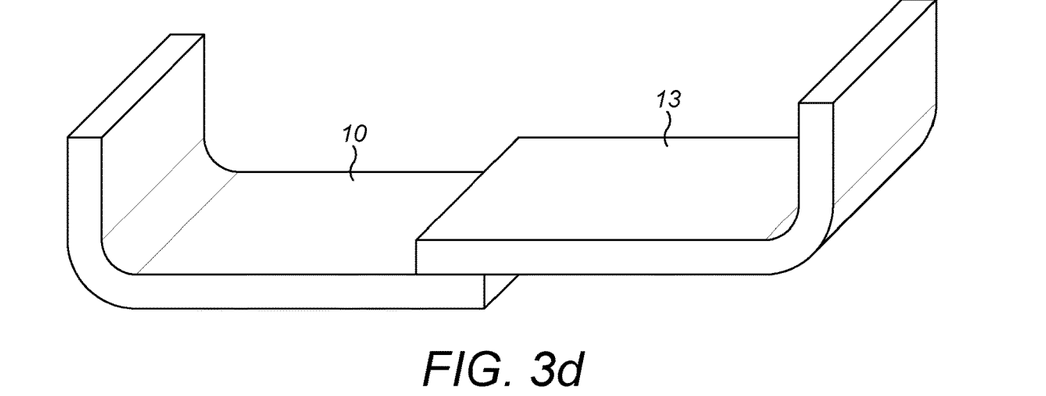

FIG. 3d shows a second piece being attached to the first piece using the resin layer(s) that are adhered to the first piece. The second piece comprises reinforcement material. The reinforcement material may be as described in relation to the first piece. As shown in FIG. 3d, the second piece has been preformed into a second set shape. The second set shape may be the same or different to that of the first set shape. The second piece may be comprise a binder material and be preformed as described in relation to the first piece.

It will be appreciated that more than one piece comprising reinforcement material may be attached to the first piece using the resin layer applied to the first piece. Additionally, lengths of tape may be applied to any subsequent piece and the resin layer from those lengths of tape may be used to attach other pieces to those subsequent pieces. Only two pieces are shown in FIG. 3d for simplicity.

Figure 3E:
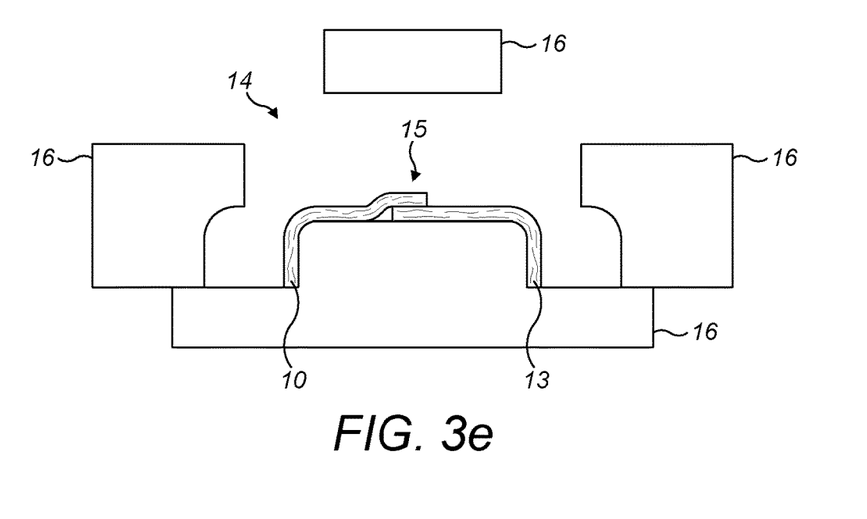

FIG. 3e shows the start of a moulding process to form the composite component into its final fixed form. FIG. 3e shows a moulding apparatus 14. The moulding apparatus comprises a plurality of mould pieces 16 which define a mould cavity 15. The attached pieces 10, 13 are loaded into the mould cavity 15. The set shape of the pieces means that they conform to the surface of the mould cavity 15. The attachment of the pieces means that their relative positioning is fixed when being loaded into the mould cavity 15.

It will be appreciated that other pieces comprising reinforcement material may be loaded into the mould cavity 15. At least some of those other pieces may be attached together using the tape as described herein. Therefore, there may be multiple separately attached pieces that are loaded into the mould cavity.

Figure 3F:
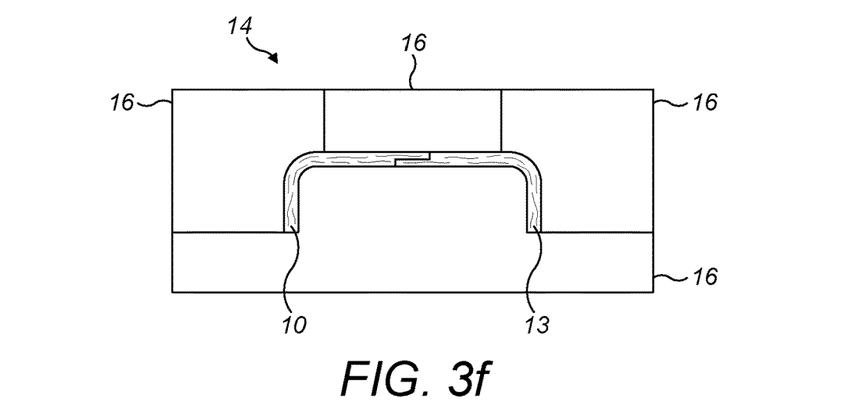

FIG. 3f shows the mould being closed around the pieces 10, 13 that have been loaded into the mould cavity. The moulding apparatus 14 injects a matrix material into the mould cavity to infuse the pieces with the matrix material. A hardener may be mixed with the matrix material prior to injection into the mould cavity. A hardener may be injected at the same time as the matrix material into the mould cavity. Therefore, the moulding apparatus 14 may inject a matrix material and a hardener into the mould cavity to infuse the pieces with the matrix material and the hardener. The moulding apparatus 14 may comprise one or more pumps to inject the matrix material (and where present the hardener) and one or more channels through the mould pieces to permit the matrix material (and where present the hardener) to flow through the mould cavity. In some cases, at least some of the matrix material (and where present the hardener) may be injected into the mould cavity before the mould is completed closed around the pieces 10, 13. The resin layer is incorporated into the matrix material when the matrix material is injected into the mould cavity.

The matrix material may comprise a resin. The matrix material may comprise an epoxy resin. The hardener may be an amine-based hardener. The matrix material is capable of dissolving the resin layer(s). The matrix material and the resin layer(s) may comprise similar epoxy-based constituents so that the matrix material is compatible with the resin layer(s) meaning that the resin layer(s) solutes into the matrix material and is cured into the matrix material. The matrix material may be Epikote TRAC 6100. The hardener may be Epikure TRAX 06150.

Once the pieces have been infused with the matrix material, the matrix material can be solidified to set in shape the reinforcement material of the pieces. The pieces may be substantially completely wetted by the matrix material prior to solidifying. The solidifying of the matrix material may take place by leaving the matrix material and reinforcement fibres in the mould until a hardener has caused the matrix material to cure. Alternatively, the mould cavity may be subjected to radiation, such as UV radiation, to cause the matrix material to cure and thus solidify.

Figure 3G:
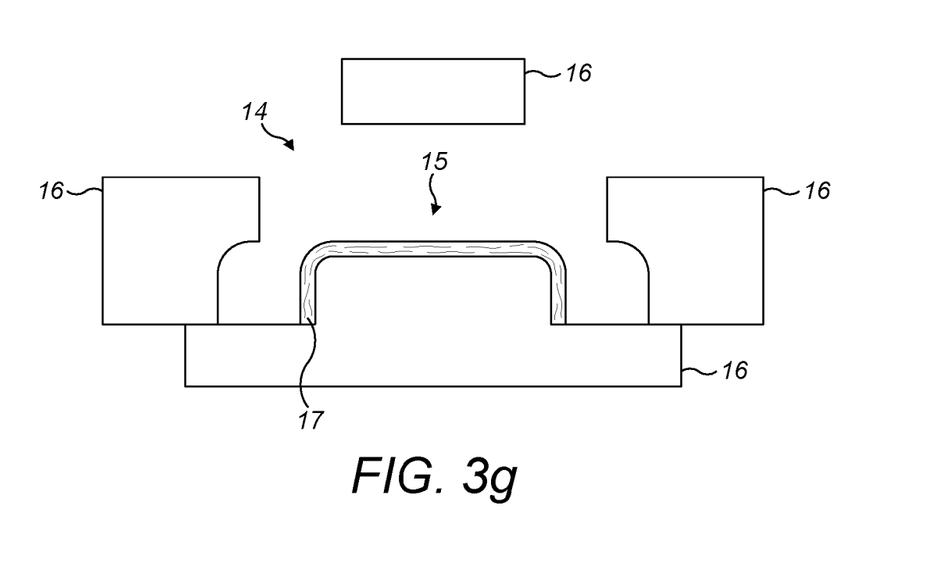
Figure 3H:
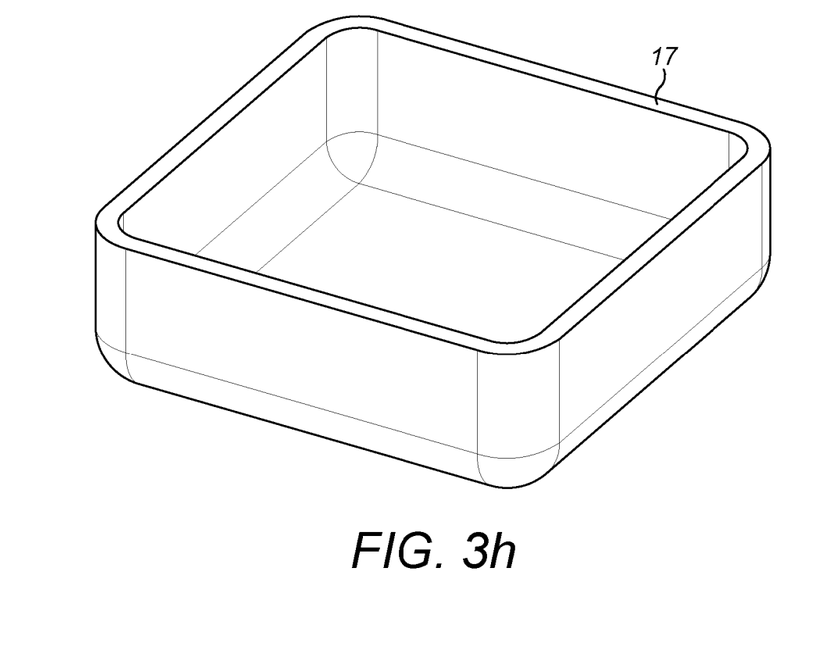

Once the matrix material has solidified then the composite component 17 can be removed from the mould cavity. This can be done by opening the mould pieces 16 as shown in FIG. 3g followed by the removal of the composite component from the mould cavity. An example composite component is shown in FIG. 3h.

Other parts may be loaded into the mould cavity in addition to the pieces that comprise reinforcing material. For instance, metal parts may be added that are then bonded to the pieces by the matrix material during the forming process. Foam cores could be added that are then bonded to the pieces by the matrix material during the forming process. The foam cores may be attached to the reinforcement material by resin layer(s) that are adhered to the reinforcement material. The process described herein is particularly advantageous for moulding parts reinforced by elements that are greater than, for example, 1 cm or greater than 10 cm in extent, which may for example be fibre tows, mats or sheets.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims. The applicant indicates that aspects of the present invention may consist of any such individual feature or combination of features. In view of the foregoing description it will be evident to a person skilled in the art that various modifications may be made within the scope of the invention.

The invention claimed is:

1. An assembly comprising:
a first piece comprising a first reinforcement material;
a second piece comprising a second reinforcement material; and
an epoxy resin layer adhered to the first piece and the second piece such that the first piece is adhered to the second piece by the epoxy resin layer, the epoxy resin layer having a spiral pattern comprising (i) a plurality of overlapping loops extending in a first direction and (ii) an epoxy resin having a viscosity of between 10000 mPa·s and 40000 mPa·s.

2. The assembly according to claim 1, comprising an epoxy-based matrix material, wherein the spiral pattern allows the epoxy-based matrix material to penetrate through the resin layer and avoid dry spots in the first and second pieces.

3. The assembly according to claim 2, wherein the epoxy resin layer is soluble in the epoxy-based matrix material.

4. The assembly according to claim 1, wherein the epoxy resin layer can be used to set the first and second pieces in a final configuration during a resin transfer process.

5. The assembly according to claim 1, comprising a resin for a resin transfer process, wherein the epoxy resin layer is formed of a material that does not contaminate the resin for the resin transfer process.

6. The assembly according to claim 5, wherein the epoxy resin layer does not have a hardener present, and the resin for the resin transfer process has a hardener present.

7. The assembly according to claim 5, wherein the epoxy resin layer does not have a hardener present, and the resin for the resin transfer process is UV curable.

8. The assembly according to claim 1, wherein the first and second reinforcement materials comprise carbon fibre.

9. The assembly according to claim 1, wherein the plurality of overlapping loops are asymmetric about a second direction that is perpendicular to the first direction, and a loop of the plurality of overlapping loops overlaps four adjacent loops of the plurality of overlapping loops.

10. A tape comprising:
a backing layer; and
an epoxy resin layer adhered to a first surface of the backing layer in a spiral pattern comprising a plurality of overlapping loops extending along a length of the first surface, the first surface providing a first level of adherence to the epoxy resin layer so that when the epoxy resin layer is applied to a surface the backing layer can be removed from the epoxy resin layer,
wherein the epoxy resin layer comprises an epoxy resin having a viscosity of between 10000 mPa·s and 40000 mPa·s.

11. The tape according to claim 10, wherein the epoxy resin layer is adhered along the whole length of the first surface.

12. The tape according to claim 10, wherein the backing layer has a width and the epoxy resin layer is adhered across part of the width of the first surface.

13. The tape according to claim 12, wherein the epoxy resin layer is adhered across a central portion of the width of the first surface.

14. The tape according to claim 10, wherein the backing layer comprises a second surface, the epoxy resin layer contacting the second surface when the tape is rolled, wherein the second surface has a second level of adherence to the epoxy resin layer, the second level of adherence being lower than the first level of adherence so that when the tape is unrolled the epoxy resin layer remains adhered to the first surface.

15. The tape according to claim 10, wherein a size of a first loop of the plurality of overlapping loops has substantially the same size as a second loop of the plurality of overlapping loops.

16. The tape according to claim 10, wherein the plurality of overlapping loops extending along the length of the first surface are asymmetric about a second direction that is perpendicular to a first direction in which the length of the first surface extends.

17. The tape according to claim 10, wherein a loop of the plurality of overlapping loops overlaps four adjacent loops of the plurality of overlapping loops.

18. A tape comprising:
a backing layer having a length and a width, the backing layer having a first surface and a second surface; and
an epoxy resin layer adhered to the first surface of the backing layer in a spiral pattern comprising a plurality of overlapping loops extending along a length of the first surface, the first surface providing a first level of adherence to the epoxy resin layer so that when the epoxy resin layer is applied to a third surface the backing layer can be removed from the epoxy resin layer,
wherein the epoxy resin layer is adhered to the backing layer along the length of the first surface and across a central portion of the width of the first surface,
wherein the epoxy resin layer comprises an epoxy resin having a viscosity of between 10000 mPa·s and 40000 mPa·s, and
wherein the epoxy resin layer contacts the second surface of the backing layer when the tape is rolled, wherein the second surface has a second level of adherence to the epoxy resin layer, the second level of adherence being lower than the first level of adherence so that when the tape is unrolled the epoxy resin layer remains adhered to the first surface.

19. The tape according to claim 18, wherein a size of a first loop of the plurality of overlapping loops has substantially the same size as a second loop of the plurality of overlapping loops.

20. The tape according to claim 18, wherein the plurality of overlapping loops are asymmetric about a second direction that is perpendicular to a first direction in which the length of the first surface extends.

21. The tape according to claim 18, wherein a loop of the plurality of overlapping loops overlaps four adjacent loops of the plurality of overlapping loops.

* * * * *